(12) United States Patent
Peon

(10) Patent No.: US 8,706,155 B1
(45) Date of Patent: Apr. 22, 2014

(54) TRANSMISSION PROTOCOL MODIFICATION TO MAXIMIZE MOBILE DEVICE BATTERY LIFE

(71) Applicant: Roberto Peon, Palo Alto, CA (US)

(72) Inventor: Roberto Peon, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/633,513

(22) Filed: Oct. 2, 2012

Related U.S. Application Data

(60) Provisional application No. 61/708,443, filed on Oct. 1, 2013.

(51) Int. Cl.
*H04B 7/00* (2006.01)
*H04W 52/00* (2009.01)
*H04W 52/02* (2009.01)
*H04W 52/04* (2009.01)

(52) U.S. Cl.
CPC .............. *H04W 52/00* (2013.01); *H04W 52/02* (2013.01); *H04W 52/04* (2013.01)
USPC ............. 455/522; 455/509; 455/574; 455/69; 370/311; 370/318; 340/7.35

(58) Field of Classification Search
CPC ........ H04W 4/00; H04W 52/00; H04W 76/00
USPC .............. 455/26.1, 41.1, 41.2, 418–420, 574, 455/127.5, 343.2, 343.3, 343.4, 343.5, 522, 455/509, 69; 709/203, 227, 228, 231, 232, 709/237; 714/748, 749, 750; 370/311, 473, 370/474, 318, 329; 340/7.32, 7.33, 7.34, 340/7.37, 7.35; 345/600
See application file for complete search history.

(56) References Cited

U.S. PATENT DOCUMENTS

| | | | | |
|---|---|---|---|---|
| 6,128,489 | A * | 10/2000 | Seazholtz et al. | 455/432.1 |
| 6,363,411 | B1 * | 3/2002 | Dugan et al. | 709/202 |
| 6,477,361 | B1 * | 11/2002 | LaGrotta et al. | 455/343.1 |
| 6,625,281 | B1 * | 9/2003 | Bernard | 379/413 |
| 8,112,508 | B1 * | 2/2012 | Ambrose et al. | 709/223 |
| 2003/0143978 | A1 * | 7/2003 | Cooper et al. | 455/406 |
| 2003/0225832 | A1 * | 12/2003 | Ludwig | 709/204 |
| 2004/0218556 | A1 * | 11/2004 | Son et al. | 370/311 |
| 2005/0197171 | A1 * | 9/2005 | Son et al. | 455/574 |
| 2006/0279430 | A1 * | 12/2006 | Arai | 340/825.73 |
| 2007/0087724 | A1 * | 4/2007 | Jang et al. | 455/347 |
| 2007/0093231 | A1 * | 4/2007 | Abhishek et al. | 455/343.4 |
| 2008/0037482 | A1 * | 2/2008 | Douglas et al. | 370/338 |
| 2011/0078255 | A1 * | 3/2011 | Radulescu et al. | 709/206 |

OTHER PUBLICATIONS

AT&T Developer Program, 2 pages http://developer.att.com/developer/forward.jsp?passedItemId=3100030, accessed Oct. 2, 2012.

* cited by examiner

*Primary Examiner* — Mahendra Patel
(74) *Attorney, Agent, or Firm* — McDonnell Boehnen Hulbert & Berghoff LLP

(57) ABSTRACT

A communications device and methods for terminating a communication session in a communications device. The method includes receiving a termination communication from a remote computing device. The termination communication indicates an intent by the remote computing device to terminate the communication session. The method also includes determining that one or more conditions exist under which the communications device should terminate the communication session without transmitting an acknowledgment communication to the remote computing device. The acknowledgement communication indicates an acknowledgment of the termination communication. The method further includes in response to determining that the one or more conditions exist, terminating the communication session on the communications device without transmitting the acknowledgment communication to the remote computing device.

25 Claims, 3 Drawing Sheets

TRANSMISSION PROTOCOL MODIFICATION TO MAXIMIZE MOBILE DEVICE BATTERY LIFE

CROSS-REFERENCE TO RELATED APPLICATION

This application claims priority to U.S. Provisional Patent Application Ser. No. 61/708,443, filed on Oct. 1, 2012. The entirety of this priority application is incorporated herein by reference.

TECHNICAL FIELD

The present disclosure relates to methods for maximizing battery life in a mobile device.

BACKGROUND

Mobile devices generally operate in various power states or modes, depending on the functionality needed to perform active tasks. For example, the power state in which the mobile device operates at a given time may depend on whether the mobile device needs to send data. If the mobile device does not need to send data, the mobile device may operate in a low-power mode, in which the mobile device's radio transmitter is powered down. In the low-power mode, the mobile device may simply listen for communications from the network. The mobile device may switch to one or more higher power modes to enable sending communications. For example, in an intermediate-power mode, the mobile device may respond to administrative inquiries from the network, update the network about the status or location of the mobile device, or conduct like operations where utilization of minimal bandwidth is acceptable. The mobile device may switch to a full or "high" power mode when active sending and receiving is required, for example, when a user is making a phone call, sending a text message, downloading a webpage, etc., during which time the mobile device may access a maximum amount of bandwidth for communication over the network.

Mobile devices generally operate in the lowest power mode that allows for performance of active tasks, so as to maximize battery life while providing sufficient performance. To that end, mobile devices typically operate in low-power mode unless and until "awoken" to switch into one of the higher power modes. Due to hardware and/or driver design, after switching to a higher power mode to send a communication, many mobile devices remain in the higher power mode for a specified period of time (a "radio timeout") after completing the transmission. Such a radio timeout may be provided for a variety of reasons, for example, to maintain an established communication channel between the mobile device and the network. However, maintaining the mobile device in the high or intermediate-power mode during the radio timeout may come at a cost of reduced battery life, and may, in some circumstances provide a relatively small benefit.

What is needed, then, are systems and methods that maximize the battery life of a mobile device, for example, by reducing the occurrence and/or duration of times during which the mobile device is in one of the higher power modes.

SUMMARY

Embodiments of the disclosure may provide a computer-implemented method for terminating a communication session in a communications device. The method includes receiving a termination communication from a remote computing device. The termination communication indicates an intent by the remote computing device to terminate the communication session. The method also includes determining that one or more conditions exist under which the communications device should terminate the communication session without transmitting an acknowledgment communication to the remote computing device. The acknowledgement communication indicates an acknowledgment of the termination communication. The method further includes in response to determining that the one or more conditions exist, terminating the communication session on the communications device without transmitting the acknowledgment communication to the remote computing device.

Embodiments of the disclosure may also provide a communications device. The communications device includes a processing system including one or more processors. The communications device also includes a radio configured to communicate with a remote computing device. The radio is configured to send data when the communications device is in a higher power mode, and the radio is inactive when the communications device is in a low-power mode. The communications device is configured to stay in the higher power mode for at least a radio timeout duration after each time the radio sends data to the remote computing device. The communications device also includes one or more computer-readable media containing instructions that, if executed by the processing system, cause the communications device to perform operations. The operations include receiving a termination communication from a remote computing device. The termination communication indicates an intent by the remote computing device to terminate the communication session. The operations also include determining that one or more conditions exist under which the communications device should terminate the communication session without transmitting an acknowledgment communication to the remote computing device. The acknowledgement communication indicates an acknowledgment of the termination communication. The operations also include, in response to determining that the one or more conditions exist, terminating the communication session on the communications device without transmitting the acknowledgment communication to the remote computing device.

Embodiments of the disclosure may also provide a method that includes receiving, using a communications device, substantive data from a remote computing device during a communication session, and sending an acknowledgement from the communications device to the remote computing device indicating that the communications device received the substantive data. The method also includes receiving, using the communications device, a session termination communication from the remote computing device, and determining, using the communications device, to abstain from sending an acknowledgement of receipt of the session termination communication to the remote computing device. Determining to abstain from sending the acknowledgement includes determining that a time between transmitting the acknowledgment and receiving the session termination exceeds an allowable time. The method also includes terminating the communication session on the communications device.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
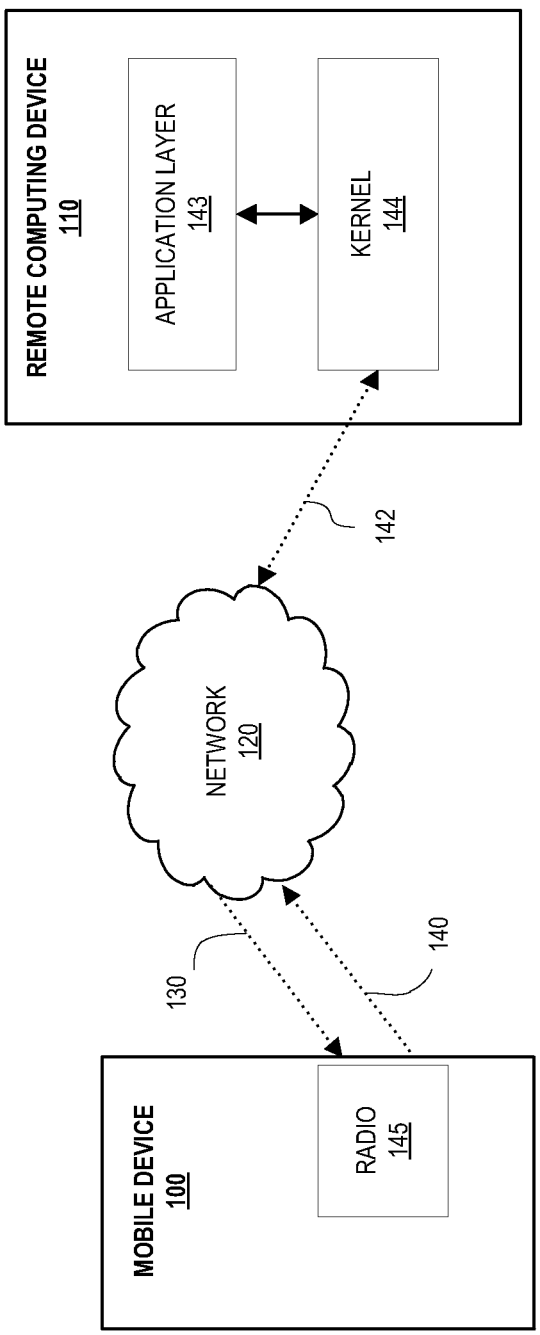
FIG. 1 illustrates a simplified schematic view of a communications device configured to communicate with a remote computing device via a network, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 2:
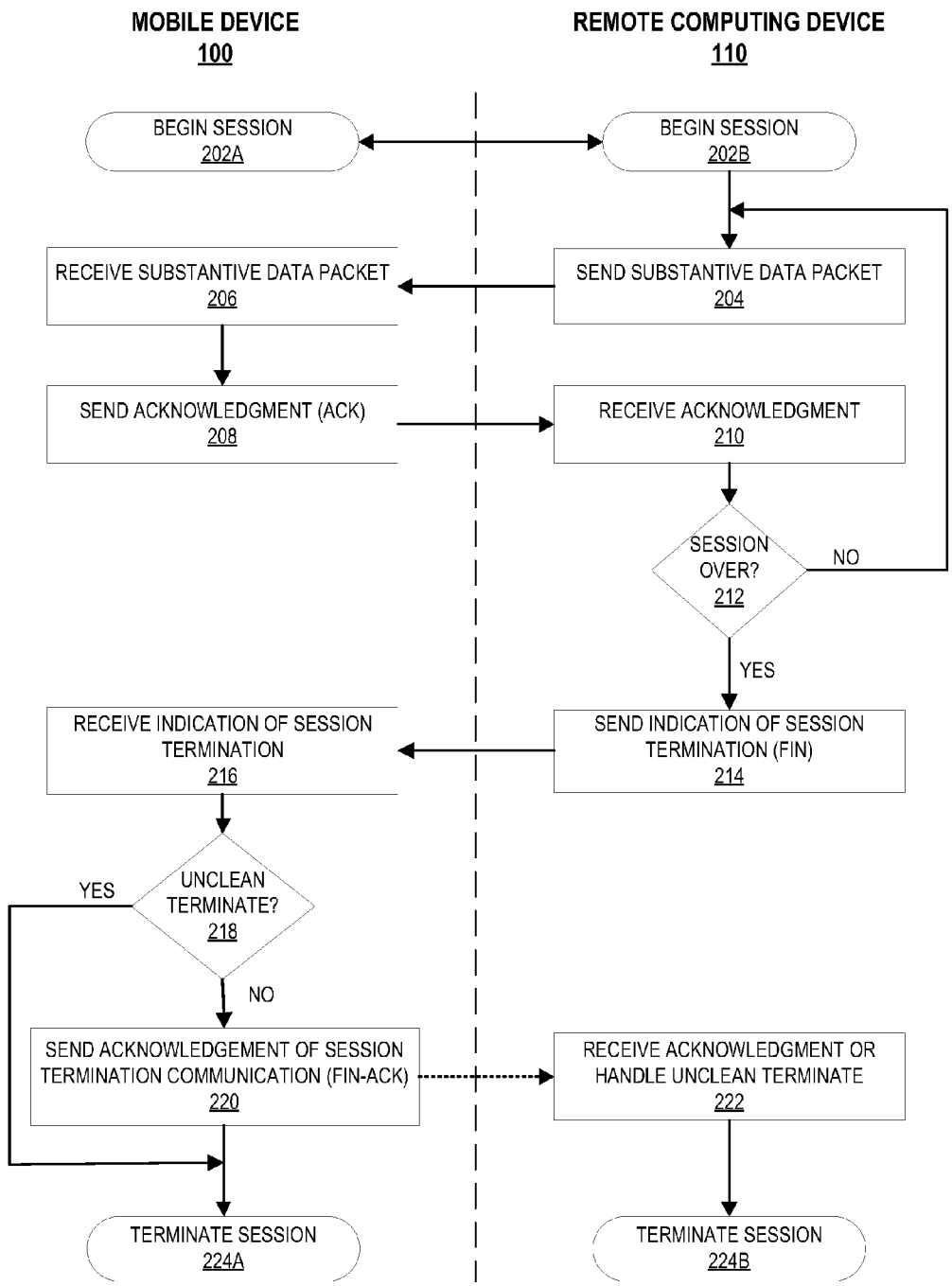
FIG. 2 illustrates a flowchart of a method for terminating a communication session between the communications device and the remote computing device, according to an embodiment.

Referring generally to FIGS. 1 and 2, FIG. 1 illustrates a communications device 100 that may be configured for communication with a remote computing device 110 (e.g., a server or another mobile device), according to the method illustrated in FIG. 2. In at least one embodiment, the communications device 100 may be a mobile device, configured to be used from various locations and/or during movement, with minimal or no time to prepare for and allow such movement. The communications device 100 and the remote computing device 110 may communicate over a network 120, e.g., a cellular communication network, wireless network, or the like, using a suitable communication protocol, such as, for example, transmission control protocol (TCP).

In at least some circumstances, the communications device 100 may serve as the data recipient or "client" and the remote computing device 110 may serve as the data provider or "server" during a communication session. At the conclusion of such a communication session, the remote computing device 110 may send a communication indicating to the communications device 100 that the session is to be terminated (i.e., that the remote computing device 110 "intends" to terminate the session). This communication may be referred to as a "FIN."

However, the remote computing device 110 may delay sending the FIN after sending the previous communication. As will be described in greater detail below, this may provide an increased likelihood that all data packets are sent by the remote computing device 110 to the communications device 100 prior to the session terminating. This delay, however, may overlap or coincide with the communications device 100 waiting in a higher power mode during a radio timeout, before switching back to a lower-power mode, as the communications device 100 waits to respond to a subsequent communication.

Responding to acknowledge the FIN, e.g., by sending a specialized packet known as a "FIN-ACK," may require restarting the radio timeout, in case the radio timeout had not already expired, or switching back to the higher power mode and starting a new radio timeout, in case the radio timeout had expired. Such additional time in the higher power mode may cost battery life; however, sending the FIN-ACK may enable the remote computing device 110 to free up resources more quickly by signaling a termination of the session. Accordingly, upon receiving the FIN, the communications device 100 may balance the burden versus the benefit of sending the FIN-ACK to determine whether or not to send the FIN-ACK to the remote computing device 110. Such determination may be made at a software level, e.g., by the operating system, by hardware, driver, chipset, or by a combination thereof.

Moreover, such determination may proceed according to one or more of a variety of factors or conditions. In at least one embodiment, the condition may be or include whether the amount of time that has elapsed between when the communications device 100 last sent a communication and when the communications device 100 received the FIN exceeds a maximum allowable time. If the time between the two is over the allowable, the condition may be satisfied.

If the condition is satisfied, the communications device 100 may abstain from sending a FIN-ACK. Instead, the communications device 100 may opt to unilaterally terminate the communication session on the communications device 100 as part of an "unclean terminate." However, if the condition is not satisfied (e.g., the FIN was delayed by less than the allowable time), the communications device 100 may determine that the burden of extending the radio timeout time is sufficiently small, such that it is outweighed by the benefits of sending the FIN-ACK.

Although terminology typically used when describing transmission control protocol (TCP) is employed herein, it will be appreciated that one or more embodiments of the disclosed systems and methods may apply to other protocols, such as asynchronous transfer mode (ATM), one or more Ethernet protocols, synchronous optical networking protocol (SONET), and/or the like. Accordingly, while the TCP terminology provided herein is employed for instructive purposes, it will be appreciated that the present disclosure may be used with any communication or transmission protocol.

Referring now specifically to the figures, FIG. 1 illustrates a schematic of the communications device 100 configured to communicate with the remote computing device 110, according to an embodiment. The remote computing device 110 may send data, for example, in packets according to a communication protocol, to the communications device 100 via the network 120 and across a first transmission link 130, which may be a cellular link. The communications device 100 may also send data, for example, in packets, to the remote computing device 110 through a second transmission signal link 140, which may also be a cellular link, and via the network 120.

The remote computing device 110 may be any type of computing device configured to send data to and/or receive data from the communications device 100 via the network 120, using a third transmission link 142. For example, the remote computing device 110 may include one or more servers (e.g., web servers), mobile devices, computers, or the like. Moreover, the third transmission link 142 may be wireless or wired, and may provide connectivity for the remote computing device 110 with the network 120 via any suitable protocol. Accordingly, the network 120 may provide a conduit for transmission of data between the remote computing device 110 and the communications device 100.

Further, the remote computing device 110 may include an application layer 143 and a kernel 144. The application layer 143 and the kernel 144 may be communicably linked via a socket. The application layer 143 may send instructions to the kernel 144, which may, in turn, cause data to be transmitted to the network 120 via the third link 142. For example, the application layer 143 may send data and/or instructions to the kernel 144, which the kernel 144 sends as TCP segments to the communications device 100.

The communications device 100 may include a radio 145, among other components, as will be described below. The radio 145 may be or include any transmitter configured at least to send data wirelessly to the remote computing device 110 via the network 120. As it is used herein, the term "communications device" may refer to any type of stationary, mobile, or standalone device, including any combination of hardware and software, capable of supporting the functionalities and data processing/transmitting techniques discussed herein. For example, the device may be a mobile phone, a tablet device, a notebook device, a personal data assistant (PDA), a base-station radio, or any type of battery-operated or battery-backed-up device, or the like.

Further, the communications device 100 may be configured to operate in at least two modes, for example, a low-power mode and one or more higher power modes. The low-power mode may be any mode in which the communications device 100 is generally not configured for sending data, although it may receive data in this mode, in at least one embodiment. For example, the radio 145 may be powered down, on standby, or in any other state configured to reduce power consumption. The higher power modes may include any mode(s) in which the communications device 100 is configured for transmitting data to the remote computing device 110. For example, the radio 145 may be powered up or otherwise activated in the higher power mode(s).

In an embodiment, the higher power modes may include an intermediate-power mode and a high-power mode. In the intermediate-power mode, transmissions may be limited to administrative communications (e.g., updating the status or location of the communications device 100 with the network 120 and/or the remote computing device 110), which may operate with a minimum bandwidth so as to preserve resources. In the high-power mode, the communications device 100 may allow for full data transmission, such as participating on sessions in which the communications device 100 downloads webpages, transfers data such as visual or audio media, telephone calls, etc. Such sessions may operate with a maximum available bandwidth so as to maximize performance.

The communications device 100 may default to operating in the low-power mode, so as to conserve power when possible. The communications device 100 may switch to one of the higher power modes (e.g., first switching to the intermediate-power mode and, if necessary, then switching to the high-power mode, or by switching directly to the high-power mode) to respond to a communication from the remote computing device 110, to a request data from the remote computing device 110, or, for example, in response to a user instruction otherwise calling for communication from the communications device 100 to the remote computing device 110. After each send, the communications device 100 may remain in the higher power mode for a period of time referred to herein as a "radio timeout." Lingering in the higher power mode for the radio timeout period may avoid dropping and reestablishing communication channels repetitively between the communications device 100 and the remote device 110 during a given communication session.

The communications device 100 may operate in one or more of the higher power modes for the duration, either continuously or intermittently, of a communication session between the communications device 100 and the remote computing device 110. At the conclusion of the session, it may be advantageous to efficiently terminate the session, allowing the communications device 100 to switch back to low-power mode and freeing resources on the remote computing device 110. Accordingly, with continuing reference to FIG. 1, FIG. 2 illustrates a flowchart of a method for terminating a communication session in the communications device 100, according to an embodiment. The method may provide for terminating a session in which the communications device 100 is the content recipient or "client," receiving content or other data from the remote computing device 110, acting as the content provider or "server." It will be appreciated that the content sent to the communications device 100 by the remote computing device 110 may originate with the remote computing device 110 or with any other device, such as, for example, a server on the Internet, another mobile device sending voice or other data, another computer, or the like.

In some instances, such content data, as well as control data, may be transmitted between the remote computing device 110 and the communications device 100 in packets, such as TCP segments. The packets may each include a header and a data section or "payload." The header may include flags and/or other control fields, providing session control information (e.g., information for opening a session, terminating a session, checking that a packet was received, and maintaining a transmission sequence) to the recipient of the packet. The data section may provide the substantive data transmitted, when present.

The communications device 100 and/or the remote computing device 110 may begin the communication session, as at 202A and/or 202B. Either or both the communications device 100 and the remote computing device 110 may initially be in "listening" mode, as is known in the art, so as to be capable of responding to a request to open a port and begin a communication session. One of the communications device 100 and the remote computing device 110 may then begin a communication session, for example, by sending a packet to the other, requesting to begin the session. The communications device 100 and the remote computing device 110 may negotiate thereafter to begin the session. One example of a process of beginning a communication session may be a "three-way handshake."

In the three-way handshake, the initial request may be referred to as a "SYN." Either the remote computing device 110 or the communications device 100 may send the SYN. A SYN may be a packet that includes a sequence number to be synchronized on the two devices, to establish the communication session. The SYN may also include a SYN flag, indicating to the recipient that the sequence number is provided as part of the packet.

The recipient of the SYN may respond with an acknowledgment of the SYN, referred to as a "SYN-ACK." The SYN-ACK may include an acknowledgment number, set to, for example, one or more than the received sequence number, and a new sequence number that the sender chooses. The SYN-ACK may also include a SYN-ACK flag, indicating to the recipient that the acknowledgment number and the sequence number are provided.

The recipient of the SYN-ACK (i.e., the sender of the SYN) may respond with an acknowledgment, referred to as an ACK. The ACK may include the sequence number, incremented by a value, e.g., one, and the acknowledgment number also incremented by a value, e.g., one. The ACK may also include an ACK flag, indicating that the acknowledgment number and the sequence number are incremented and provided.

The communication session may, at this point, be considered open and active and the remote computing device 110 may proceed to transmission of substantive data to the communications device 100. In duplexing protocols such as TCP, each TCP segment (packet) sent by the server (e.g., the remote computing device 110) may be received by the client (e.g., the communications device 100), and may include a sequence number. The client may acknowledge receipt by sending an ACK, with each ACK providing the sequence number of the next expected packet (e.g., the highest sequence number received from the server, plus one). In this way, the communication session may be monitored to ensure accurate and complete data transfer. It will be appreciated, however, that the sending of an ACK may not be on a one-to-one ratio with receiving TCP segments. For example, a certain number of TCP segments may be received, and then one ACK may be sent back, with the sequence number incremented commensurately, so as to set forth the sequence number of the next expected TCP segment.

Thus, the communication session may proceed with the remote device 110 sending "substantive data" packets (e.g., TCP segments with a payload of content data), as at 204, and the mobile device 110 receiving the packets, as at 206. Upon receiving one or more of the packets, the mobile device 110 may send an ACK in response, as at 208. Again, it will be appreciated that the relationship between sending substantive data packets at 204 and sending an acknowledgment 208 may not be 1:1, as a single ACK may serve as the acknowledgment of reception for several packets. The remote computing device 110 may receive the acknowledgment, as at 210, thereby closing the loop on the duplexing communication. As the term is used herein, "substantive data" generally refers to data (e.g., packets such as TCP segments) containing content being transferred. In contrast, "session data" refers to administrative data, generally related to an event that occurs as part of the session, for example, beginning or ending the session (e.g., an SYN, ACK, SYN-ACK, FIN, etc.).

Eventually, the remote computing device 110 may determine that the session should be concluded, as at 212. For example, the remote computing device 110 may determine that all substantive data has been transmitted. The remote computing device 110 may delay, however, sending an indication that it intends to conclude the session. For example, the application layer 143 may send data to the kernel 144 at a faster rate than the kernel 144 is able to send the data over the network 120 to the communications device 100. Accordingly, the data may be queued with the kernel 144, pending being sent. If the kernel 144 receives instructions to send a termination indication while data is queued, the kernel 144 may disregard or otherwise vacate the data in the queue, such that the queued data is not sent to the communications device 100. Thus, the application layer 143 may delay providing session termination instructions to the kernel 144 to send the termination indication until it is at least reasonably likely that all data has been sent.

After delaying, the remote computing device 110 may send an indication of session termination to the communications device 100, as at 214. The indication of session termination may be referred to as a "FIN," which may be a type of session data packet. The FIN may include a flag, indicating that there is no more data from the sender. In turn, assuming that the FIN packet is not lost in transit, the communications device 100 may receive the FIN, as at 216.

In some instances, the delay in the remote computing device 110 may correspond to a relatively large amount of time elapsing between the communications device 100 sending the last ACK, as at 208, in response to receiving the last substantive packet, as at 206, and receiving the FIN, as at 216. It will be appreciated that such a "relatively large amount of time" may be relative to the average interval between receiving substantive data packets from the remote computing device 110. For example, the relatively large amount of time may be about two, three, four, ten, 100, 1000 or more times as long as the average interval between receipt of the substantive packets.

Upon receiving the FIN, the communications device 100 may determine whether to initiate an unclean termination, as at 218. In duplexing protocols, the client (e.g., the communications device 100) may, as a default, respond by sending an acknowledgment of the termination communication, which may be referred to as a "FIN-ACK." Sending the FIN-ACK may be beneficial, as it enables the server (e.g., the remote computing device 110) to de-allocate resources from the now-terminated session with the sender (e.g., the communications device 100) of the FIN-ACK, and use such resources for other processes. On the other hand, if the communications device 100 is not required to send the FIN-ACK, the communications device 100 may switch back to the low-power mode at the conclusion of the radio timeout after sending the last ACK (or any other previous communication), rather than at the conclusion of the radio timeout after sending the FIN-ACK. This may allow the communications device 100 to switch to the low-power mode sooner and/or may avoid switching from the low-power mode back to one of the higher power modes to send the FIN-ACK, either of which may reduce power consumption in the communications device 100.

Accordingly, the communications device 100 may determine whether to conduct an unclean termination according to one or more conditions configured to indicate the balance of the benefits versus the burdens of sending the FIN-ACK. One condition for determining whether to conduct an unclean termination may be whether the communications device 100 received the FIN via a cellular link. For example, if the FIN was received over a cellular link, it may indicate that the powering up the radio 145 of the communications device 100 may be called for to send a FIN-ACK. This may indicate that abstaining from sending such a FIN-ACK may benefit the communications device 100 by avoiding entering and/or prolonging the communications device 100 operating in one of the higher power modes. If the FIN was received over another type of connection, for example, over a wired connection or LAN connection, different components may be called on to provide the FIN-ACK, which may reduce the benefit to the unclean termination.

As mentioned above, another condition may include whether more than a maximum allowable time has elapsed since the radio 145 last transmitted. For example, the maximum allowable time may be measured between the receipt by the communications device 100 of the last substantive packet, or the sending of the last ACK, and the receipt by the communications device 100 of the FIN. The allowable time may be determined prior to the initiation of the session, for example, provided as part of the driver, operating system, hardware, or the like. In some embodiments, setting of the allowable time may be determined on a session-by-session basis, for example, by agreement between the communications device 100 and the remote computing device 110, or in any other manner.

If the time since transmitting the last ACK (and/or the time between sending the last ACK, or receiving the last substantive data packet, and receiving the FIN) is over the allowable time, the communications device 100 may determine that conditions are present the unclean termination. If the time since the last transmission is less than the allowable time, the communications device 100 may determine that such conditions are not present, and may thus proceed with a normal termination.

The allowable time may be set at less than the radio timeout duration. Accordingly, if the FIN is received after a short time (less than the radio timeout), the relatively small extension of the radio timeout during which the communications device 100 is in the higher power mode after receipt of the FIN may be worth the benefit to the remote computing device 110 of sending the FIN-ACK. That is, if the FIN is received, for example, after 1/10 of the radio timeout elapses, resetting the radio timeout by sending the FIN-ACK means the communications device 100 is in one of the higher power modes for 1.10 (full radio timeout after sending the FIN, plus the partial radio timeout elapsing between sending the last ACK and receiving the FIN) times as long as it would be if no FIN-ACK is sent. On the other hand, if the FIN-ACK is received at 9/10 of the radio timeout after sending the last ACK, sending the FIN-ACK may result in the communications device 100 being in the higher power mode for 1.90 times what it would be if it did not send the FIN-ACK. While the first case may be an insubstantial increase in time spent in one or more of the higher power modes, avoiding the extra time in the second case may be beneficial, even in view of the cost to the remote computing device 110 of not receiving a FIN-ACK.

It will be appreciated that the use of 1/10 and 9/10 is merely illustrative and not considered limiting on the present disclosure. Moreover, in various embodiments, the allowable time may be any fraction of the radio timeout duration, for example, about 3/4, about 2/3, about 1/2, about 1/3, about 1/4, about 1/5, about 1/6, about 1/10, or about 1/100 of the radio timeout duration.

Another condition, which may be provided in combination with, in addition to, or in lieu of the allowable time condition just described may be a determination of whether the communications device 100 is being powered by its battery, or whether it is receiving power from an external source, such as a connection to a municipal power grid (e.g., plugged into an electrical outlet). If the communications device 100 is being powered by such an external source, preserving battery power may be of less importance. Accordingly, if the communications device 100 is being powered by the external source, the allowable time may be extended or the communications device 100 may be configured to not provide an unclean termination, regardless of the time between sending the last ACK and receiving the FIN. On the other hand, if the device is being powered by a battery, the allowable time may be decreased and/or considered to preserve battery life.

Yet another condition may be whether the communications device 100 is operating other applications or otherwise receiving commands that call for the communications device 100 to operate in the higher power mode during the time between sending the last ACK and receiving the FIN. For example, a plurality of applications may call for the radio 145 of the communications device 100 to send communications. The plurality of applications may thus open a plurality of sessions, which may or may not be active at a given time. These sessions may terminate at different times; as such, there may be no benefit to an unclean termination for one session, as other sessions may remain open and/or active, calling for the communications device 100 to remain in the higher power mode, regardless of whether the radio abstains from or sends a FIN-ACK to terminate one such session. In such case, the conditions for proceeding with an unclean termination may not be satisfied.

Additionally, a condition may be whether the communications device 100 has returned to a low-power state prior to receiving the FIN. This may be a similar or a distinct condition from whether the allowable time has elapsed, even if the allowable time is set to the radio timeout. For example, the communications device 100 may track what mode it is currently in. If the communications device 100 determines that it has already switched to the low-power state, after sending the last ACK but before receiving the FIN, it may determine that an unclean termination is required and thus forego switching back to the high-power mode to sending the FIN-ACK. Further, in some cases, the condition may always be true, as the communications device 100 may be preset to abstain from sending a FIN-ACK in any case.

Still referring to FIG. 2, when the communications device 100 determines at 216 that an unclean termination is warranted, the communications device 100 may proceed to terminating the communication session, as at 224A, without sending a FIN-ACK. Abstaining from such a communication may, in at least one embodiment, be provided by altering the network protocol, for example, changing the TCP stack, such that the communications device 100 is configured to unilaterally terminate the session without sending the FIN-ACK, thereby deviating from a duplexing protocol, in some examples.

On the other hand, if the communications device 100 determines that the conditions for an unclean termination are not met, the communications device 100 may proceed to sending the acknowledgement of receipt of the termination communication (i.e., the FIN-ACK). Having sent the FIN-ACK as per normal, the communications device 100 may proceed to terminating the session as at 224A.

Depending at least on whether an unclean termination is conducted by the communications device 100, the remote computing device 110 may receive the FIN-ACK or handle an unclean termination, as at 222 and then terminate the session as at 224B. Accordingly, the remote computing device 110 and/or the network 120 may provide one or more unclean termination handling processes. For example, the remote computing device 110 may provide a session timeout, such that the remote computing device 110 recognizes that the session has been terminated by the communications device 100, without reception of the FIN-ACK. Such session timeouts may be conventionally provided by the remote computing device 110, for example, to handle loss of communication (e.g., power outage, signal loss, etc.) with the communications device 100 during a session, if the communications device 100 fails to respond with an ACK after a certain amount of time.

In another embodiment, the remote computing device 110 and/or the network 120 may recognize that the communications device 100 has the capability of providing an unclean termination, or may be otherwise configured to account for the communications device 100 having the ability to terminate the session without acknowledging the session termination communication. For example, hardware on the remote computing device 110 and/or the network 120 may be configured to provide a substitute or "synthetic" FIN-ACK to the kernel 144, thereby terminating the session normally, from the point of view of the kernel 144, without receiving the FIN-ACK from the communications device 100. Moreover, in some embodiments, hardware and/or software provided by the remote computing device 100 and/or the network 120 may respond to recognizing that the communications device 100 is capable of an unclean termination and set the session timeout at a reduced duration.

Figure 3:
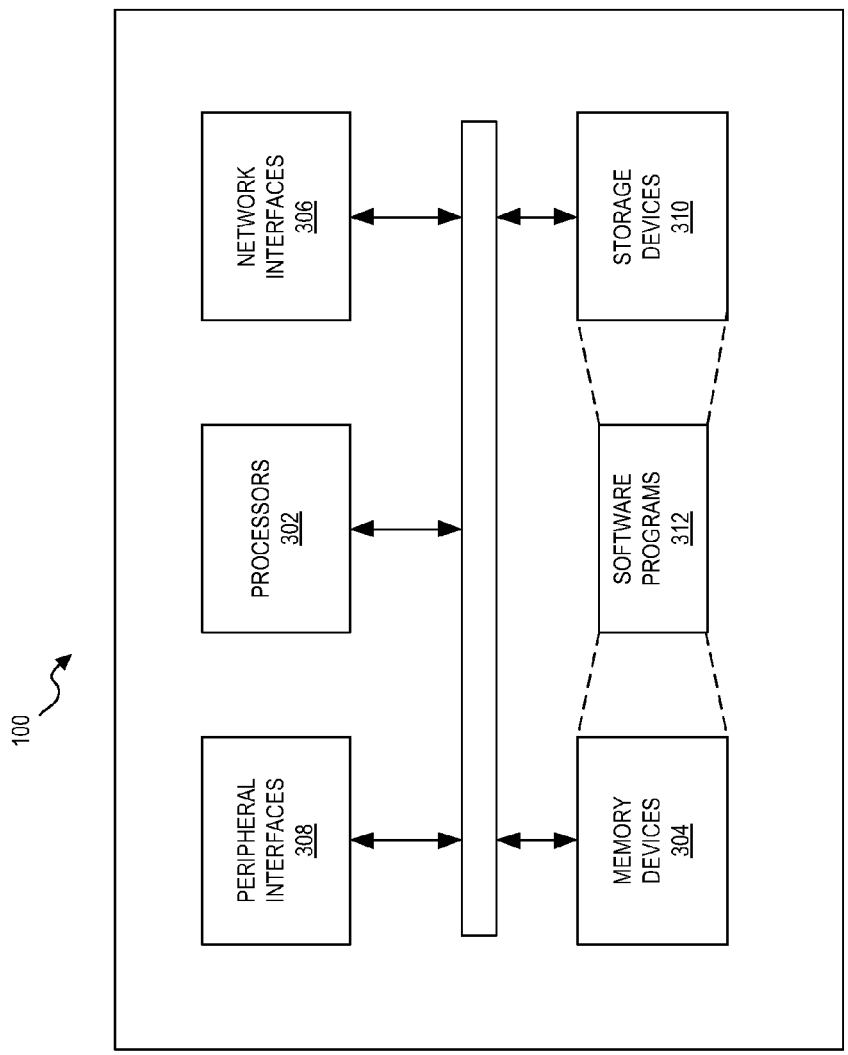
FIG. 3 illustrates a simplified schematic of the communications device, according to an embodiment.

FIG. 3 illustrates a schematic view of the communications device 100, according to an embodiment. The communications device 100 may include one or more processors 302 of varying core configurations and clock frequencies. The communications device 100 may also include one or more memory devices or computer-readable media 304 of varying physical dimensions and storage capacities, such as flash drives, hard drives, random access memory, etc., for storing data, such as images, files, and program instructions for execution by the processor 302.

The communications device 100 may also include one or more network interfaces 306. The network interfaces 306 may include the radio 145, shown in and described above with reference to FIG. 1. The network interface 306 may also include any hardware and/or applications or other software, such that the network interface 306 may also be configured to receive signals from remote sources such as the remote computing device 110. Accordingly, the network interface 306 may include Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

The communications device 100 may further include one or more peripheral interfaces 308, such as keyboards, mice, touchpads, computer screens, touchscreens, etc., for enabling human interaction with and manipulation of the communications device 100. In some implementations, the components of device 100 need not be enclosed within a single enclosure or even located in close proximity to one another, but in other implementations, the components and/or others may be provided in a single enclosure.

The memory devices 304 may further be physically or logically arranged or configured to provide for or store data on one or more storage devices 310. The storage devices 310 may include one or more file systems or databases, and one or more software programs 312, which may contain interpretable or executable instructions for performing one or more of the disclosed implementations. Those skilled in the art will appreciate that the above-described componentry is merely one example of a hardware configuration, as the communications device 100 may include any type of hardware components, including any necessary accompanying firmware or software, for performing the disclosed implementations. The communications device 100 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the communications device 100 may be used to execute programs according to instructions received from another program or from another computing system altogether. Similarly, commands may be received, executed, and their output returned entirely within the processing and/or memory of communications device 100. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and may include methods within program code, whether static or dynamic, and whether they return a value or not. The term "function" has been used in the claims solely to avoid ambiguity or conflict with the term "method," the latter of which may be used to indicate the subject matter class of particular claims.

What is claimed is:

1. A computer-implemented method for terminating a communication session in a communications device, comprising:
   receiving a termination communication from a remote computing device, wherein the termination communication indicates an intent by the remote computing device to terminate the communication session;
   determining whether one or more conditions exist under which the communications device should terminate the communication session without transmitting an acknowledgment communication to the remote computing device, wherein the acknowledgement communication indicates an acknowledgment of the termination communication;
   terminating the communication session on the communications device without transmitting the acknowledgment communication to the remote computing device, when the one or more conditions are determined to exist, wherein determining that the one or more conditions exist comprises determining that the communications device is in a low-power mode; and
   sending an acknowledgment of the termination communication when the one or more conditions are determined not to exist.

2. The method of claim 1, wherein determining that the one or more conditions exist comprises determining that the termination communication was received by the communications device over a cellular link.

3. The method of claim 1, wherein determining that the one or more conditions exist comprises determining that the communications device is operating on battery power.

4. The method of claim 1, wherein, when the communications device is in the low-power mode, a radio of the communications device is powered down such that the communications device is configured to receive but not send communications while in the low-power mode.

5. The method of claim 1, wherein determining that the one or more conditions exist comprises determining that a radio that would be used to transmit the acknowledgement communication is powered down.

6. The method of claim 1, wherein determining that the one or more conditions exist comprises determining that at least a specified allowable period of time has elapsed since the communications device last transmitted a communication to the remote computing device.

7. The method of claim 6, wherein the specified allowable time is less than a radio timeout duration.

8. The method of claim 1, wherein determining that the one or more conditions exist comprises determining that no other communication sessions with remote computing devices are open in the communications device.

9. The method of claim 1, wherein determining that the one or more conditions exist comprises determining that a parameter has been set in the communications device to refrain from transmitting an acknowledgment communication in response to a termination communication in any communication session with a remote computing device.

10. A communications device, comprising:
a processing system comprising one or more processors;
a radio configured to communicate with a remote computing device, wherein the radio is configured to send data when the communications device is in a higher power mode, and the radio is inactive when the communications device is in a low-power mode, and wherein the communications device is configured to stay in the higher power mode for at least a radio timeout duration after each time the radio sends data to the remote computing device; and
one or more computer-readable media containing instructions that, if executed by the processing system, cause the communications device to perform operations comprising:
receiving a termination communication from a remote computing device, wherein the termination communication indicates an intent by the remote computing device to terminate the communication session;
determining that one or more conditions exist under which the communications device should terminate the communication session without transmitting an acknowledgment communication to the remote computing device, wherein the acknowledgement communication indicates an acknowledgment of the termination communication, and wherein that the one or more conditions exist comprises determining that the communications device is in the low-power mode; and
in response to determining that the one or more conditions exist terminating the communication session on the communications device without transmitting the acknowledgment communication to the remote computing device.

11. The communications device of claim 10, wherein determining that the one or more conditions exist comprises determining that the termination communication was received by the communications device over a cellular link.

12. The communications device of claim 10, wherein determining that the one or more conditions exist comprises determining that the communications device is operating on battery power.

13. The communications device of claim 10, wherein determining that the one or more conditions exist comprises determining that a specified period of time has elapsed since the communications device last transmitted a communication to the remote computing device.

14. The communications device of claim 13, wherein the specified period of time is less than a radio timeout duration.

15. The communications device of claim 10, wherein determining that the one or more conditions exist comprises determining that no other communication sessions with remote computing devices are open or active in the communications device.

16. The communications device of claim 10, wherein determining that the one or more conditions exist comprises determining that a parameter has been set in the communications device to refrain from transmitting an acknowledgment communication in response to a termination communication in any communication session with a remote computing device.

17. A method, comprising:
receiving, using a communications device, substantive data from a remote computing device during a communication session;
sending an acknowledgement from the communications device to the remote computing device indicating that the communications device received the substantive data;
receiving, using the communications device, a session termination communication from the remote computing device;
determining, using the communications device, to abstain from sending an acknowledgement of receipt of the session termination communication to the remote computing device, wherein determining to abstain from sending the acknowledgement comprises determining that a time between transmitting the acknowledgment and receiving the session termination exceeds an allowable time, wherein the allowable time is less than a radio timeout; and
terminating the communication session on the communications device.

18. The method of claim 17, wherein determining to abstain further comprises determining that a radio of the communications device was powered down prior to receiving the session termination communication.

19. The method of claim 17, wherein determining to abstain further comprises determining whether at least a maximum allowable time elapsed between transmitting the acknowledgment and receiving the session termination communication.

20. The method of claim 17, wherein determining to abstain further comprises determining that the communications device is not being supplied with power from an external source.

21. A communications device, comprising:
a processing system comprising one or more processors; and
one or more computer-readable media containing instructions that, if executed by the processing system, cause the device to perform operations comprising:
receiving, using a communications device, substantive data from a remote computing device during a communication session;
sending an acknowledgement from the communications device to the remote computing device indicating that the communications device received the substantive data;
receiving, using the communications device, a session termination communication from the remote computing device;
determining, using the communications device, to abstain from sending an acknowledgement of receipt of the session termination communication to the remote computing device, wherein determining to abstain from sending the acknowledgement comprises determining that a time between transmitting the acknowledgment and receiving the session termination exceeds an allowable time, wherein the allowable time is less than a default radio timeout; and
terminating the communication session on the communications device.

22. The device of claim 21, wherein determining to abstain further comprises determining that a radio of the communication device was powered down prior to receiving the session termination communication.

23. The device of claim 21, wherein determining to abstain further comprises determining whether at least a maximum allowable time elapsed between transmitting the acknowledgment and receiving the session termination communication.

24. The device of claim 23, wherein the maximum allowable time is less than a radio timeout.

25. The device of claim 21, wherein determining to abstain further comprises determining that the communications device is not being supplied with power from an external source.

* * * * *

UNITED STATES PATENT AND TRADEMARK OFFICE
CERTIFICATE OF CORRECTION

| | | |
|---|---|---|
| PATENT NO. | : 8,706,155 B1 | |
| APPLICATION NO. | : 13/633513 | |
| DATED | : April 22, 2014 | |
| INVENTOR(S) | : Roberto Peon | |

It is certified that error appears in the above-identified patent and that said Letters Patent is hereby corrected as shown below:

On the Title Page

Item (60): delete "Oct. 1, 2013" and replace with -- Oct. 1, 2012 --.

Signed and Sealed this
Sixteenth Day of September, 2014

Michelle K. Lee
*Deputy Director of the United States Patent and Trademark Office*